United States Patent [19]

Ablay et al.

[11] Patent Number: 4,837,858
[45] Date of Patent: Jun. 6, 1989

[54] SUBSCRIBER UNIT FOR A TRUNKED VOICE/DATA COMMUNICATION SYSTEM

[75] Inventors: Sewim F. Ablay, Hoffman Estates; Stuart W. Thro, Cary; Kenneth J. Zdunek, Schaumburg, all of Ill.

[73] Assignee: Motorola, Inc., Schaumburg, Ill.

[21] Appl. No.: 44,392

[22] Filed: Apr. 30, 1987

[51] Int. Cl.⁴ .................. H04M 11/00; H04Q 7/00; H04B 7/14; H04J 3/16
[52] U.S. Cl. ........................... 455/34; 455/15; 455/17; 455/54; 379/63; 370/95
[58] Field of Search .............. 455/15, 13, 17, 32, 455/34, 33, 54, 56; 379/63; 370/95, 110.1

[56] References Cited

U.S. PATENT DOCUMENTS

| | | | |
|---|---|---|---|
| 4,012,597 | 3/1977 | Lynk, Jr. et al. | 179/41 A |
| 4,352,183 | 9/1982 | Davis et al. | 371/33 |
| 4,409,687 | 10/1983 | Berti et al. | 455/32 |
| 4,534,061 | 8/1985 | Ulug | 455/32 |
| 4,553,262 | 11/1985 | Coe | 455/15 |
| 4,573,206 | 2/1986 | Grauel et al. | 455/33 |
| 4,574,163 | 3/1986 | Zato | 179/2 EA |
| 4,593,389 | 6/1986 | Wurzburg et al. | 370/110.1 |
| 4,609,778 | 9/1986 | Franklin et al. | 179/2 DP |
| 4,672,601 | 6/1987 | Ablay | 370/31 |
| 4,675,863 | 6/1987 | Paneth et al. | 370/50 |
| 4,682,367 | 6/1987 | Childress et al. | 455/17 |
| 4,685,123 | 8/1987 | Hsia et al. | 379/93 |
| 4,689,788 | 8/1987 | Wurzburg et al. | 370/110.1 |
| 4,697,281 | 9/1987 | O'Sullivan | 379/59 |
| 4,707,832 | 11/1987 | Glenn et al. | 370/110.1 |

Primary Examiner—Jin F. Ng
Assistant Examiner—David H. Kim
Attorney, Agent, or Firm—Thomas G. Berry; Wayne J. Egan

[57] ABSTRACT

A trunked voice/data subscriber is provided that operates in either a voice mode, or one of three data modes. In a first data mode, the voice/data subscriber monitors the voice control channel to enable rapid participation in a voice call. In a second data mode, the subscriber monitors an assigned data channel until either commanded to change modes or until there has been no data activity for a predetermined time interval. Lastly, the subscriber may operate to remain in the last mode used so that, over time, the subscriber resides primarily in the mode predominately used. According to the invention, the voice/data subscriber must request a channel for each voice transmission. However, a data channel request need only be transmitted in no data channels are currently reallocated. If a data channel has been allocated, the subscriber may transmit at any time without first requesting access.

17 Claims, 11 Drawing Sheets

SUBSCRIBER UNIT FOR A TRUNKED VOICE/DATA COMMUNICATION SYSTEM

TECHNICAL FIELD

This invention relates generally to trunked communications systems and more particularly to trunked communication systems that transceive both voice and data.

BACKGROUND ART

In a basic RF trunked system there exists a high degree of flexibility to partition voice conversations between different groups so that no one group of users is specifically aware when another group of users makes use of the system. Typically, these groups are subdivided into subgroups so that calls may be made upon either a group, subgroup or individual basis depending upon the type of communication desired by an initiating subscriber.

To establish a voice communication between a group of units operating on a trunked system, a subscriber unit transmits a data packet called an "inbound signalling word" (ISW) on a control channel that is maintained for such purposes. The ISW contains at least the requesting unit's unique ID code, which may contain or be used to obtain the requesting subscriber's current talk-group. The request is forwarded to a central controller, which decodes the request, and transmits on the control channel a data packet called an "outbound signalling word" (OSW) to all subscriber units, which continuously monitor the control channel when not participating in a voice conversation. The OSW is a channel grant which contains the talk-group code of the requesting unit, and the voice channel number assigned for the conversation. The OSW causes the requesting unit to move to the voice channel and commence transmitting, while simultaneously causing all other subscriber units in the same talk-group to move to the voice channel as listening units. In this way a group call is set up. If, however, all voice channels are in use when a subscriber unit transmits an ISW, the central controller typically sends the requesting subscriber a "Busy OSW".

In addition to voice messages, it is desirable to send data information across a trunked radio channel. In some data systems, a subscriber unit obtains a trunked data communication channel via the same procedure used to obtain a voice channel However, this practice is inefficient and spectrally wasteful, due to the time it takes for a requesting subscriber to transmit an ISW and receive a channel grant OSW from the central and the time it takes to set up and clean-down calls on a voice channel. At contemporary data transmission rates, it is anticipated that an entire typical data message would take substantially less time to transmit than the time required to set-up a channel (approximately 0.5 seconds). Thus, assigning a data channel pursuant to the same procedure as assigning a voice channel would be wasteful of spectrum and consume precious system time that could be better used to transmit data messages.

Other trunked communication systems desirous to accommodate data traffic have permanently dedicated one or more channels to handling data traffic. While this avoids the access time problem noted above, this technique is contrary to the basic principles of trunked communication systems, which strive to allocate channel resources across a plurality of users as required. Therefore, the practice of having dedicated data channels, permanently removed from the channel allocation "pool" of frequencies, is wasteful of spectral resources and leads to inefficient system operation. Moreover, the dedicated data channel systems lack the capacity to dynamically redistribute or allocate the data traffic load across the available data channels Such systems typically permanently assign a subscriber unit to a data channel thereby building in future problems as the number of data subscribers increases on a particular channel.

Accordingly, there exists a need for a trunked communication system that can accommodate both voice and data signals, and that operates in true trunked manner to efficiently utilize spectral resources.

SUMMARY OF THE INVENTION

Accordingly, it is an object of the present invention to provide an improved trunked communication system.

It is a further object of the present invention to provide a trunked communication system capable of accommodating both voice and data traffic.

It is a further object of the present invention to accommodate data traffic without permanently removing one or more channels from the trunked channel resources.

It is yet another object of the present invention to provide a voice/data subscriber unit capable of operating in the trunked communication system of the present invention.

It is yet a further object of the present invention to provide a voice/data subscriber unit capable of operating in plurality of data modes.

It is yet another object of the present invention to provide a trunked voice/data communication system which accommodates prior voice only and data-only subscribers It is yet a further object of the present invention to provide a voice/data trunked communication system which permits prior data-only subscribers to communicate notwithstanding the absence of an assigned data channel.

It is yet a further object of the present invention to provide a trunked communication system that minimizes spectrally wasteful access time while providing trunked data communication.

Briefly, according to the invention, a trunked voice/data subscriber is provided that operates in either a voice mode, or one of three data modes. In a first data mode, the voice/data subscriber monitors the voice control channel to enable rapid participation in a voice call. In a second data mode, the subscriber monitors an assigned data channel until either commanded to change modes or until there has been no data activity for a predetermined time interval. Lastly, the subscriber may operate by remaining in the last mode used so that, over time, the subscriber resides primarily in the mode predominately used.

According to the invention, the voice/data subscriber must request a channel for each voice transmission. However, a data channel request need only be transmitted if no data channels are currently allocated. If a data channel has been allocated, the subscriber may transmit at any time without first requesting access. Thus, the present invention maximizes data throughput by minimizing data access request, thereby reducing data traffic congestion and conserving transmission time and spectrum.

BRIEF DESCRIPTION OF THE DRAWINGS

The features of the present invention which are believed to be novel are set forth with particularity in the appended claims. The invention, together with further objects and advantages thereof, may be understood by reference to the following description, taken in conjunction with the accompanying drawings, and the several figures in which like reference numerals identify like elements, and in which:

DETAILED DESCRIPTION OF THE PREFERRED EMBODIMENT

Figure 1:
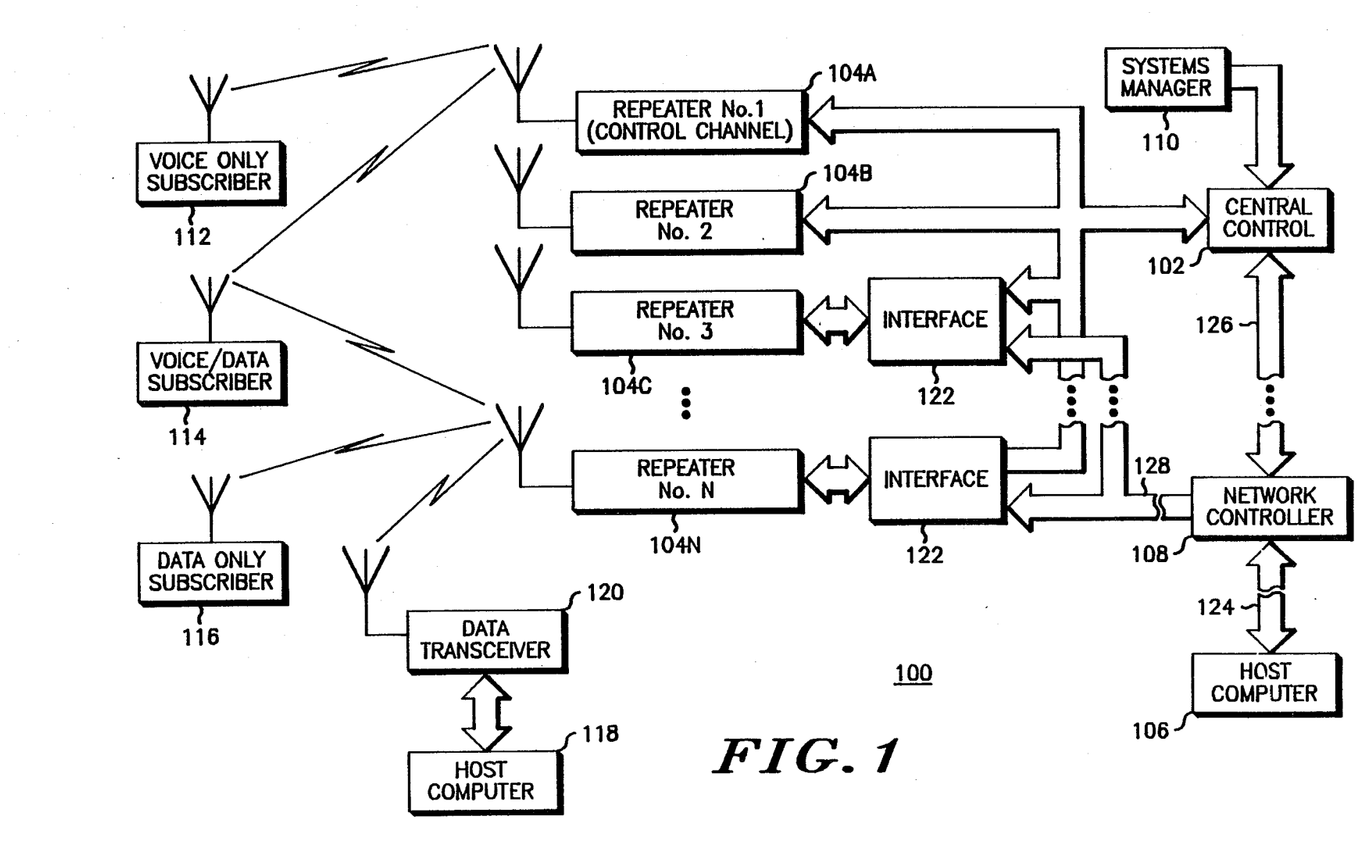
FIG. 1 is a block diagram of the trunked communication system of the present invention.

Referring now to the drawings, and in particular to FIG. 1, there is shown a block diagram of the trunked voice/data communication system (100) of the present invention The centralized or fixed-end equipment comprises a central controller 102, which is responsible for allocating the channel resources (represented here by repeaters 104a-104N) among the many subscriber units. Of the available communication channels, one (repeater 104a) is selected to be a voice control channel, which will communicate with any trunked subscriber capable of transmitting voice traffic. Typically, the particular repeater selected to be the control channel (104a) is periodically changed as a control measure.

Preferably, each of the repeaters 104a-N are capable of operating as a voice channel, control channel, or data channel. To accommodate data traffic, such repeaters are equipped with a data interface 122. The data interfaces 122 are responsible for encoding outbound data, decoding and error correcting inbound data, repeater control, and providing an interface between the repeater and the network controller 108. Alternately, a predetermined subset of the total number of repeaters may be equipped for data or use as a control channel. The data network comprises at least one host computer 106, which is coupled (i.e., wireline host) to a network controller 108. The network controller 108 is responsible for data traffic routing and communicating with the central controller 102 to request the allocation of a data channel. Those skilled in the art will appreciate that if the host computer 106, the network controller 108 and the central controller 102 are co-located, the intercouplings (124-128) may be direct. However, should remote locations be desired, such communications may be maintained through the use of data modems as is known in the art. Optionally, or additionally, the trunked voice/data communication system 100 may employ one or more radio frequency (RF) coupled host computers 118. The RF host 118 communicates as a trunked control station via any suitable data transceiver 120. The primary difference between the wireline host 106 and the RF host 118 is that the data subscribers communicate directly (i.e., via both the inbound and outbound frequencies of a data equipped repeater) with the RF host, whereas the wireline host 106 transceives all information via the inbound or outbound frequency of a data equipped repeater. Accordingly, the data network of the present invention may employ several computers in either a centralized or distributed processing arrangement.

Generally, the fixed-end equipment also includes a system manager console 110 that enables the supervisor of a communication service provider to set a number of operational parameters that control the operation of the trunked communication system. Typical examples of such parameters include the maximum number of assignable data channels (if any), whether voice or data will be the priority traffic, and various threshold values that control when data channels may be added or reallocated to voice traffic Thus, at any particular time, the trunked communication system of the present invention need not have any channels allocated for data traffic Conversely, if voice traffic is low, or if data traffic enjoys a priority status or is particularly heavy one or more channels may be allocated for data communication According to the present invention, a predetermined channel ordinarily comprises the first channel to be allocated for data. Preferably, this first assigned data channel (hereinafter "the master data channel") has the same frequency as any single frequency data-only subscribers (116) to provide maximum compatibility with existing data equipment. Alternately, a random channel may be the first assigned data channel; however, the multi-channel data-only subscribers may have to scan the available channels to find it. Thus, the present invention prefers to first assign a selected channel, and, thereafter, assign any other data equipped (122) channel as an additional data channel.

The present invention allocates data channels for a time interval determined by either the system manager or a default parameter. The length of the allocation period may vary with the time of day, system loading or other such parameters. By reserving a channel for data use over a time period, data channel requests are minimized and spectral efficiency is maximized since a data subscriber need not request a data channel for each separate data transmission As a general principle, the goal of any trunked communication system is to effectively allocate the limited channel resources amongst a plurality of subscriber units. The present invention contemplates three classes of subscriber units: voice-only subscribers 112, voice/-data subscribers 114, and data-only subscribers 116. The voice-only subscribers 112 are contemplated to be any existing trunked subscriber unit having a compatible signalling protocol to allow interaction with the system (100). The data-only subscribers (116) are contemplated to be any multiple or single channel data transceivers such as the KDT 800 ™, manufactured by Motorola, Inc., or functional equivalent Of course, receive-only data devices, such as any of the Motorola family of display pagers, may also operate to receive paging data over an assigned data channel Additionally, the present system contemplates a voice/data subscriber 114 capable of operating within the trunked system 100. In this way, the trunked system of the present invention accommodates existing equipment, while providing enhanced communication capabilities. Subscriber units are typically comprised of either mobile, portable or control stations. Typically, mobile units are understood to be transceivers designed to operate in a vehicle A portable unit is typically understood to be a transceiving or receive-only device designed primarily to be carried on or about the person. Control stations are usually permanent or semi-permanent installations in buildings or other such fixed locations. These are collectively referred to herein as subscriber units, which communicate with one another through the fixed-end equipment.

Figure 2A:
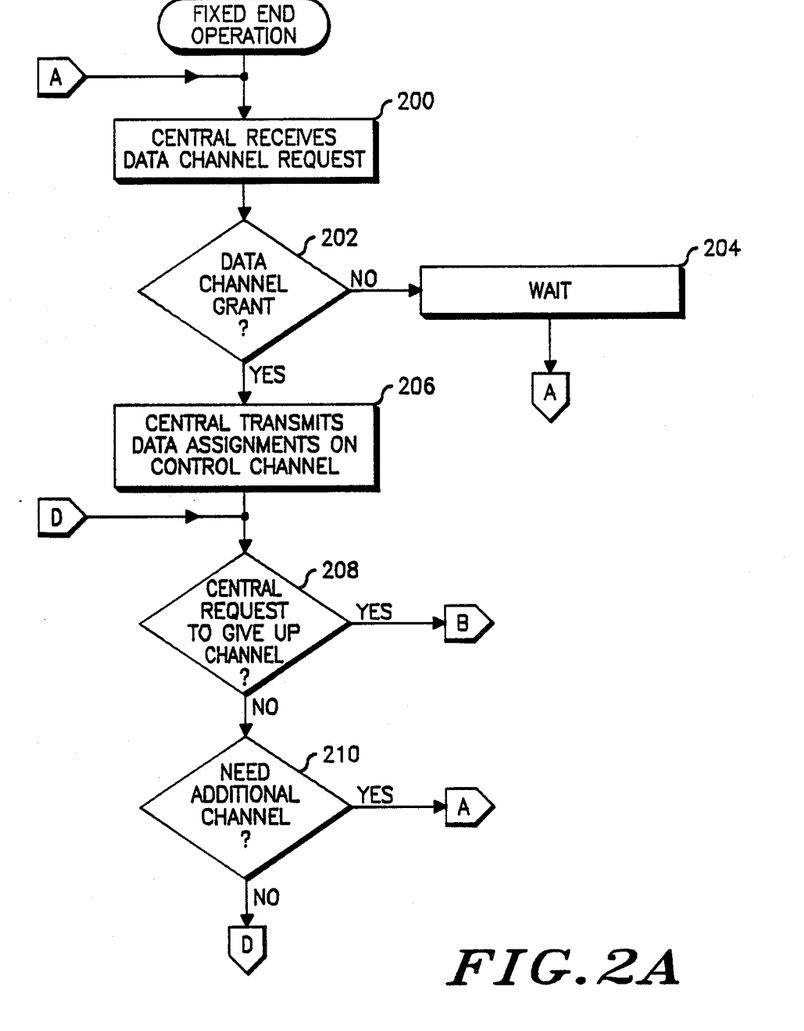
FIGS. 2a through 2c are flow diagrams illustrating the steps executed by the fixed-end equipment of FIG. 1.
Figure 2B:
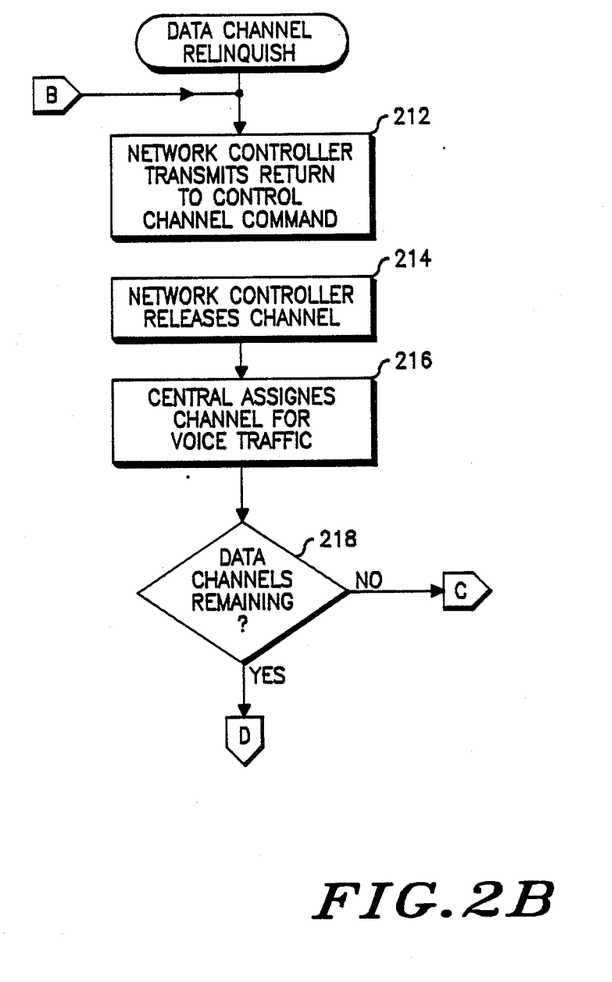
Figure 2C:
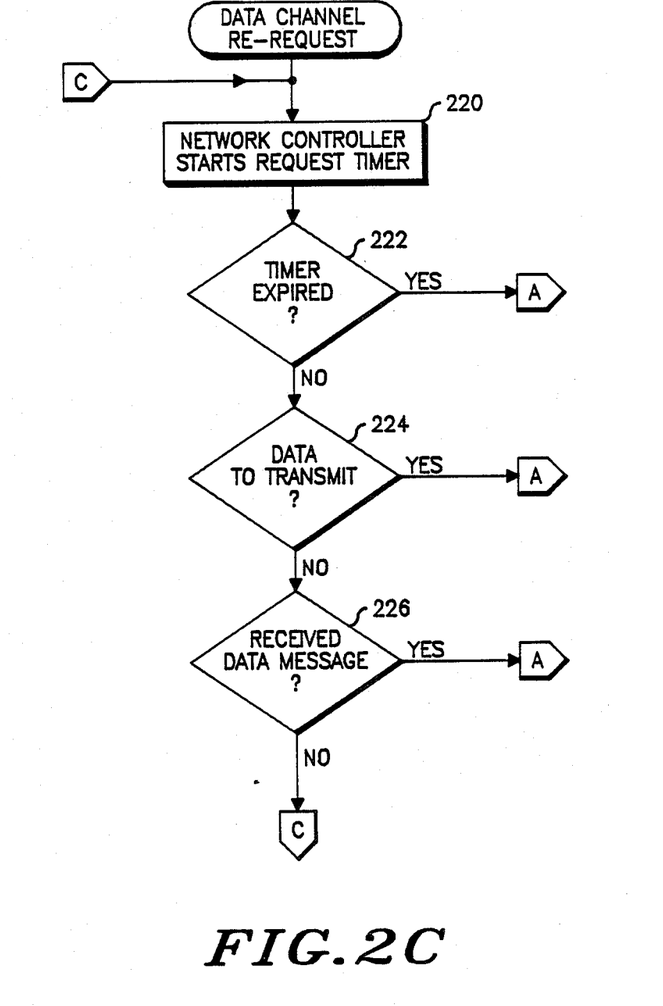

The steps executed by the fixed-end equipment are illustrated in FIGS. 2a through 2c. Referring now to FIG. 2a, in step 200, the central 102 receives a data channel request either from the network controller 108 or from a voice/data subscriber 114. The voice/data subscriber 114 may communicate such a data channel request via the control channel 104a when the subscriber has data to transmit. The network controller 108 may communicate a similar request over the connection 126 to the central controller in several circumstances to be hereinafter described For a single channel data-only subscriber 116 to request a channel, a request may be made over the master data channel to the network controller since the data-only subscribers cannot transceive on the voice control channel. According to the present invention, the data-only subscribers may communicate with the network controller irrespective of the fact that no data channels are currently assigned The reason for this is that a de-keyed repeater continues to operate as a receive-only device. In this way, the network controller 108 can "hear" a data channel request from a data-only subscriber 116 and repeat it to the central controller 102. If a data channel is available, the central controller will format and return a data channel grant both over the control channel 104a (to the voice/data subscribers 114) and to the network controller 108 via the connection 126.

Accordingly, decision 202 tests to determine whether a data channel has been granted by the central If not, the routine proceeds to step 204, where the network controller (or data subscriber) waits a predetermined time interval before returning to reference letter A of FIG. 2a to again request a data channel If the central 102 grants a data channel, the routine proceeds to step 206, where the central transmits the data channel assignment over the control channel 104a and to the network controller 108 Thereafter, data-only subscribers 116 and voice/data subscribers 114 operating in the data mode may communicate over any of the assigned data channels Data operation may continue without further data channel requests for the allocated time period, which may be determined by the system manager 110. When the allocation time period has expired, or higher priority voice traffic exists, the central controller 102 transmits an instruction to the network controller 108 to relinquish the data channel Thus, decision 208 tests to see whether the central has so instructed. If so, the routine proceeds to reference letter B of FIG. 2b where the channel is relinquished. If not, the routine proceeds to decision 210, which tests to see whether an additional data channel is needed.

If the data channel traffic on any existing data channel exceeds a predetermined threshold, the network controller 108 may request an additional data channel from the central controller 102. To do this, the network controller proceeds to reference letter A of FIG. 2a to transmit another data channel request to the central. If another data channel is available for data traffic, the central may assign an additional data channel Of course, when another data channel is assigned, the data traffic load, per channel, is uneven. Accordingly, the present invention contemplates leveling the data load among the available data channels to maximize data communication. Two preferred methods for allocating data channels and leveling the data traffic load is described in two co-pending applications filed on an even date herewith. The first is by Garry Hess (Ser. No. 044380 4-30-87), and the second is by Ken Zdunek Ser. No. 44525 4-30-87, and both are entitled "Method For Dynamically Allocating Data Channels On A Trunked Communication System", with each being assigned to the same assignee as the present invention. These cases are hereby incorporated by reference as if fully set forth herein.

Referring again to FIG. 2a, if decision 210 determines that another data channel is not needed, the routine proceeds to reference letter D of FIG. 2a, which forms the fixed-end operational loop comprising decisions 208 and 210. The fixed-end remains on this loop until either a data channel is requested to be relinquished or another data channel is requested.

Referring now to FIG. 2b, the steps executed to relinquish a data channel are shown. Assuming that the central controller 102 has requested the network controller 108 to give up a data channel, the network controller transmits a "return to control channel" command 212 over the data channel to be relinquished. All data compatible subscribers receiving this command return to the control channel 104a. Of course, single channel data-only subscribers continue to monitor their particular single frequency. In step 214, the network controller 108 releases the data channel to the central controller. In step 216, the central 102 may now assign this channel for a voice call. After this, decision 218 determines whether there are remaining data channels If the network controller 108 has released only one of several data channels, the routine proceeds to reference letter D of FIG. 2a to continue data operation. However, if the sole data channel was relinquished, the routine proceeds to reference letter C of FIG. 2c.

Referring now to FIG. 2c, the network controller 108, after relinquishing the sole data channel, starts a request timer in step 220. Decision 222 determines whether this timer has expired. If so, the routine returns to reference letter A of FIG. 2a to request a data channel. If the timer has not expired, the network controller 108 determines whether the host computer 106 has any data for transmission. If the determination of decision 224 is that the host has data to transmit, the routine proceeds to reference letter A of FIG. 2a to request a data channel. Otherwise, the network controller determines in decision 226 whether a data message has been received from a data-only subscriber or an RF host computer. If the determination of decision 226 is that such a data message was received, the network controller 108 "knows" that the channel which carried the data is idle and that a data-only subscriber wishes to communicate. Accordingly, the routine returns to reference letter A of FIG. 2a, where the network controller requests a data channel to allow it to communicate with the data-only subscriber. However, if the network controller 108 has received no such data message, the routine continues by returning to reference letter C of FIG. 2c, which forms a waiting loop until either the request timer expires or some data activity occurs.

Figure 3A:
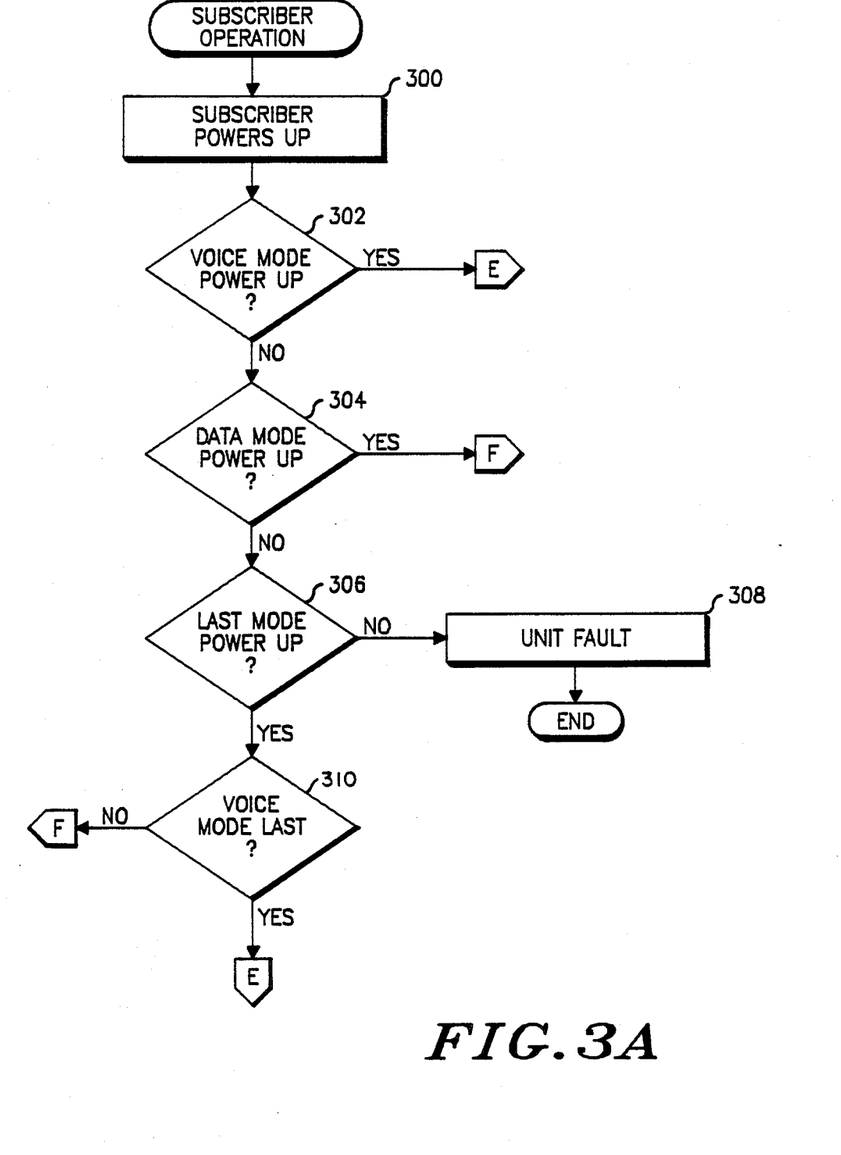
FIGS. 3a through 3f are flow diagrams illustrating the steps executed by, the voice/data subscribers of FIG. 1.

The steps executed by the data/voice subscriber 114 are shown in FIGS. 3a through 3f. Referring now to FIG. 3a, in step 300 of FIG. 3a, the subscriber unit powers up. During power up, the subscriber unit may execute any self-check routines and initialize operational flags and variables. During this time, the subscriber unit determines in decision 302 whether to operate primarily in the voice mode. If so, decision 302 transfers control to reference letter E of FIG. 3b for voice mode operation. If not, decision 304 tests whether the subscriber operates primarily in the data mode. If decision 304 determines that the subscriber normally operates in the data mode, the routine proceeds to reference letter F of FIG. 3d for data mode operation.

Alternately, the subscriber unit may use its last mode of operation. Thus, if the last communication was a voice call, the subscriber unit would operate in the voice mode. Conversely, if the last communication was a data transmission, the subscriber would operate in the data mode. Decision 306 determines if the last mode operational option is selected If not, the routine proceeds to step 308, which signals that a unit fault has occurred for failure to determine one of the only three available modes of operation. However, if the determination of decision 306 is that the last mode was selected, decision 310 determines whether the last activity was a voice call. If so, the routine proceeds to reference letter E of FIG. 3b for voice mode operation. If the determination of decision 310 was that a data transmission was last made, the routine proceeds to reference letter F of FIG. 3d for data mode operation.

Figure 3B:
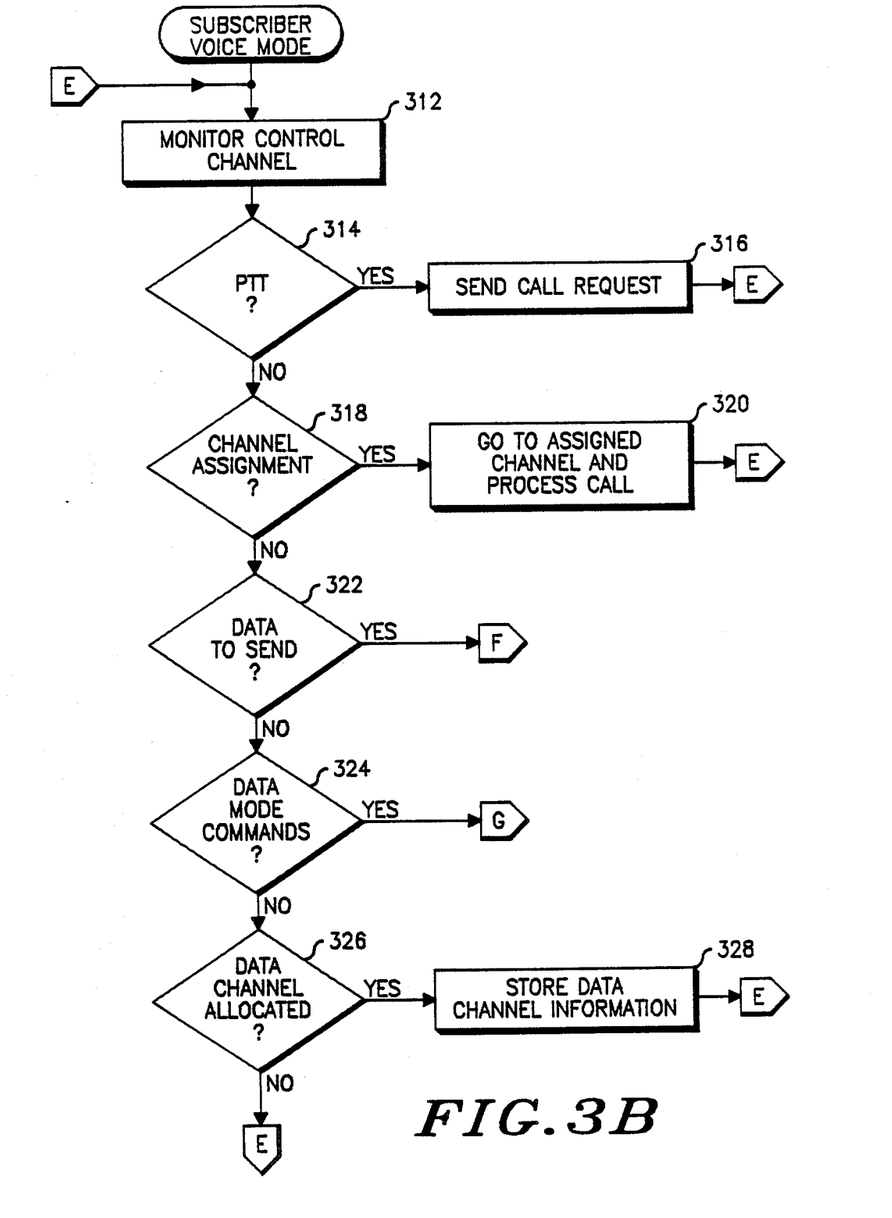

Referring now to FIG. 3b, the steps executed by a voice/data subscriber 114 in the voice mode are shown. In step 312, the subscriber unit monitors the control channel. According to the present invention, the voice mode subscriber unit must at all times be either monitoring the control channel, or participating in a voice call on one of the available voice channels. Accordingly, the voice mode subscriber continuously monitors the control channel until a command is received or the operator transmits. According, decision 314 determines whether the subscriber operator has pressed the push-to-talk (PTT) switch. If so, step 316 transmits a voice call request over the control channel to the central controller 102. Following this, the subscriber returns to reference letter E of FIG. 3b to monitor the control channel. If the PTT switch was not newly depressed, the routine proceeds to decision 318 to determine whether a channel assignment has been received over the control channel.

If the determination of decision 318 is that a channel assignment has been received, the routine proceeds to step 320, where the subscriber goes to the assigned voice channel to participate in the call. After the completion of the call, the routine returns to reference letter E of FIG. 3b to again monitor the control channel.

Figure 3C:
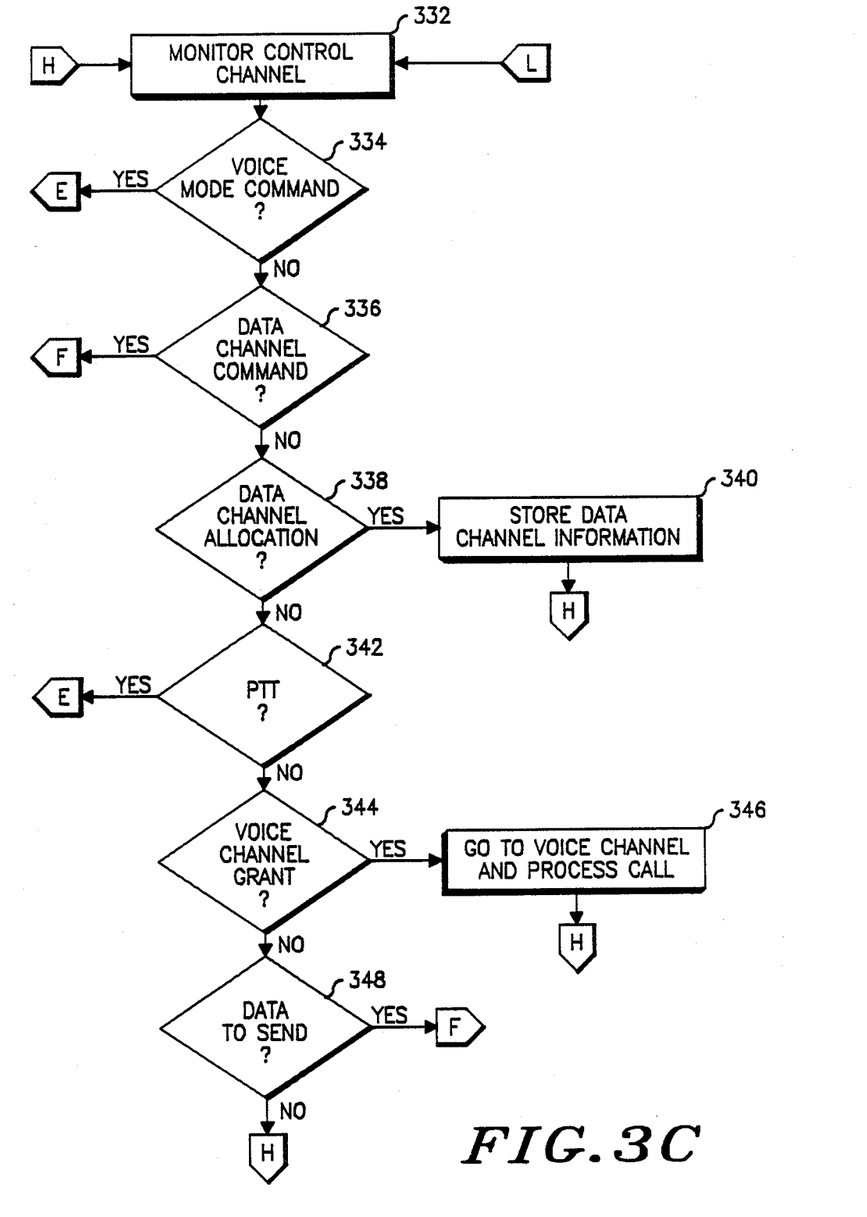
Figure 3D:
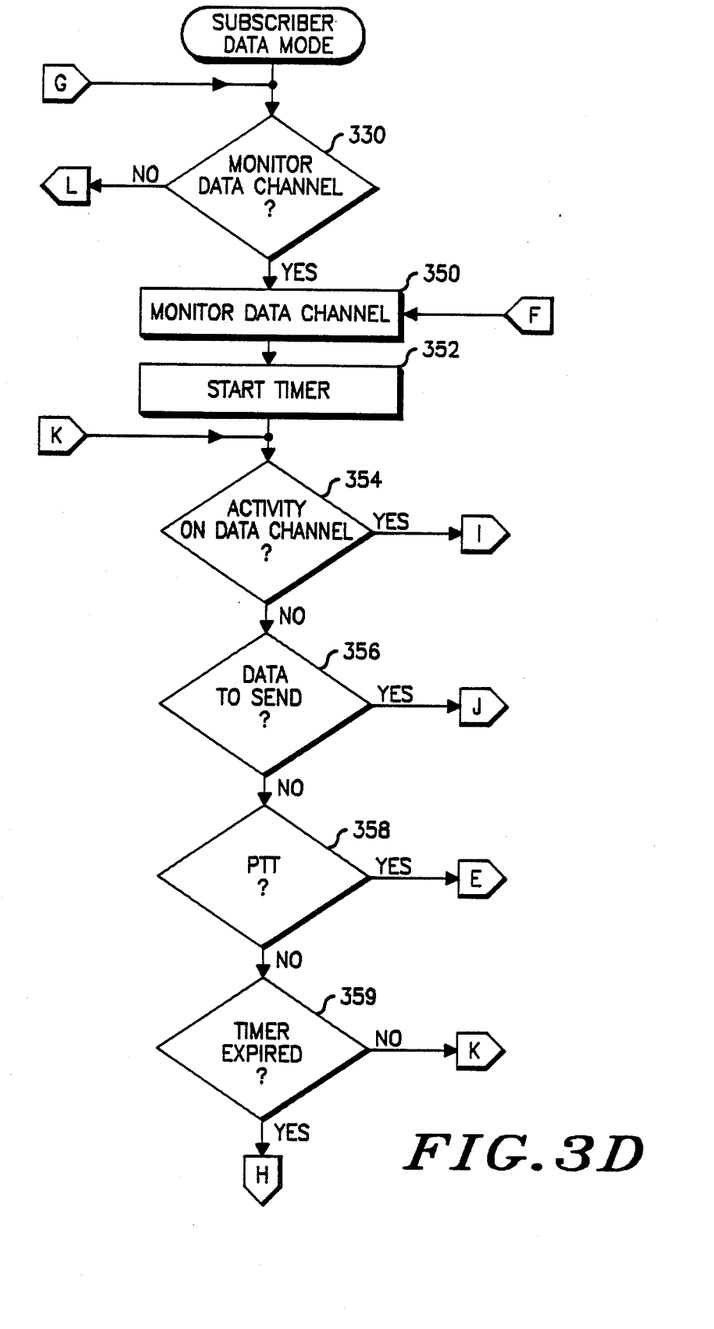

If the subscriber operator has entered data for transmission, decision 322 changes the subscriber's operating mode to the data mode and the routine proceeds to reference letter F of FIG. 3d. Decision 324 determines whether the voice mode subscriber has received a command over the control channel to go to the data mode to receive a message from the host computer 106. Preferably, the central 102 keeps track of the subscribers operating in the voice mode. The network controller 108 thereby avoids wasted transmission time by not transmitting a data message to a subscriber known not to be monitoring one of the assigned data channels. Thus, the network controller may request the central to command a voice mode subscriber, whether on a voice channel or the control channel, to move to an assigned data channel to receive a data message. Alternately if the subscriber may not be interupted from existing voice call, the central may wait until the conclusion of the voice call and transmit the data channel command via the voice control channel. Upon receiving such a command decision 324 routes the program to reference letter G of FIG. 3d to participate in the data transmission.

While operating in the voice mode, any subscriber unit monitoring the control channel may receive any data channel allocation information transmitted from the central 102 over the control channel. Accordingly, decision 326 tests to determine if such data channel allocation information has been received. If so, the routine proceeds to step 328, where the information is stored for later use. If not, decision 326 routes the program to reference letter E of FIG. 3b, where the subscriber continues to operate in the loop of FIG. 3b.

Referring now to FIG. 3d, the steps executed by the voice/data subscriber 114 while in the data mode are shown. According to the present invention, a voice/data subscriber may operate in the data mode in any one of three ways: the data monitor mode, the voice monitor mode, and the last channel mode. In the data monitor mode, the subscriber unit monitors one of the assigned data channels until commanded to return to the control channel or the voice mode. In the voice monitor data mode, a subscriber unit may operate in the data mode, while monitoring the control channel, thereby enabling rapid participation in any voice messages. In the voice monitor mode, a subscriber may momentarily go to the data channel to transceive data and thereafter immediately return to the control channel upon completion of the transmission or reception. Alternately, as the name implies, the last channel mode comprises the subscriber monitoring either the data channel or the control channel depending upon the last communication type.

Accordingly, decision 330 determines whether the subscriber should monitor the data channel. An affirmative decision results for a data monitor mode subscriber, or a last mode subscriber that had previously transmitted or received on the data channel. In all other cases, the determination of decision 330 causes the subscriber to monitor the control channel step 332 of FIG. 3c. This is also designated as reference letter L in FIG. 3c. Referring now to FIG. 3c, once monitoring the control channel, the subscriber continuously attempts to decode commands and channel assignments. Accordingly, decision 334 determines whether a voice mode command has been received. A voice mode command causes the subscriber to revert to the voice mode as illustrated in FIG. 3b. Failing this, decision 336 determines whether a data channel assignment has been received from the central controller 102.

As previously mentioned, the central 102 keeps track of the subscribers operating in the voice mode. The network controller 108 avoids wasted transmission time by not transmitting a data message to a subscriber known not to be monitoring one of the assigned data channels. Thus, the network controller requests the central to command a voice mode subscriber to an assigned data channel to receive a data message. Accordingly, if decision 336 determines that a data channel command has been received, control reverts to reference letter F or FIG. 3d, wherein the subscriber moves to monitor the data channel. If not assigned to a data channel, the routine proceeds to decision 338, which determines whether new data channel allocation information has been received. If so, the information is conveniently stored in step 340 and the routine returns to the reference letter H to again monitor the control channel.

Decision 342 determines whether the operator has activated the push-to-talk switch to initiate a voice conversation. If the determination of decision 342 is that the push-to-talk switch has been depressed, the routine proceeds to reference letter E of FIG. 3b, thereby switching to the voice mode of operation to participate in a voice call. A high degree of flexibility is afforded in the present invention by allowing the subscriber unit to operate in the data mode, while monitoring the control channel. Thus, in decision 344 the subscriber determines whether a voice channel grant has been received on the control channel. If so, subscriber unit operates (step 346) to process the call and then returns to the data mode of operation to monitor the control channel (reference letter H of FIG. 3c).

If no voice grant has been received, decision 348 determines whether the subscriber has data to transmit. If so, the routine proceeds to reference letter F of FIG. 3d, where the subscriber goes to the data channel to await data transmission. If a subscriber has no data to transmit, the routine reverts to reference letter H of FIG. 3c to continually monitor the control channel, while checking for commands and assignments in the subscriber unit's operational loop.

Referring now to FIG. 3d, assuming an affirmative determination from decision 330, the subscriber unit monitors an assigned data channel (step 350). Step 352 starts an inactivity timer, which causes the subscriber to revert to the control channel if there has been no data activity by any subscriber for the predetermined timer interval. Accordingly, decision 354 determines whether there is any current activity on the data channel. If so, the routine proceeds to reference letter I of FIG. 3e, where the subscriber unit operates to receive the data and process it. If there is no activity, the routine proceeds to decision 356, which determines if the subscriber has any data to transmit to the host computer 106 (or 118). If so, the routine proceeds to reference letter J of FIG. 3f for the subscriber data mode transmission routine. If the subscriber has no data to transmit, decision 358 determines whether the subscriber's operator has activated the PTT switch. If so, the routine proceeds to reference letter E, thereby changing to the voice mode. If the PTT was not activated, decision 359 determines whether the timer has expired. If the determination of decision 359 is that the timer has not expired, the routine proceeds to reference letter K of FIG. 3d to form a loop checking for data channel activity. If, however, there has been no data activity for the period of the timer, decision 359 routes control to reference letter H of FIG. 3c, where the subscriber unit begins to monitor the control channel (step 332), while remaining in the data mode.

Figure 3E:
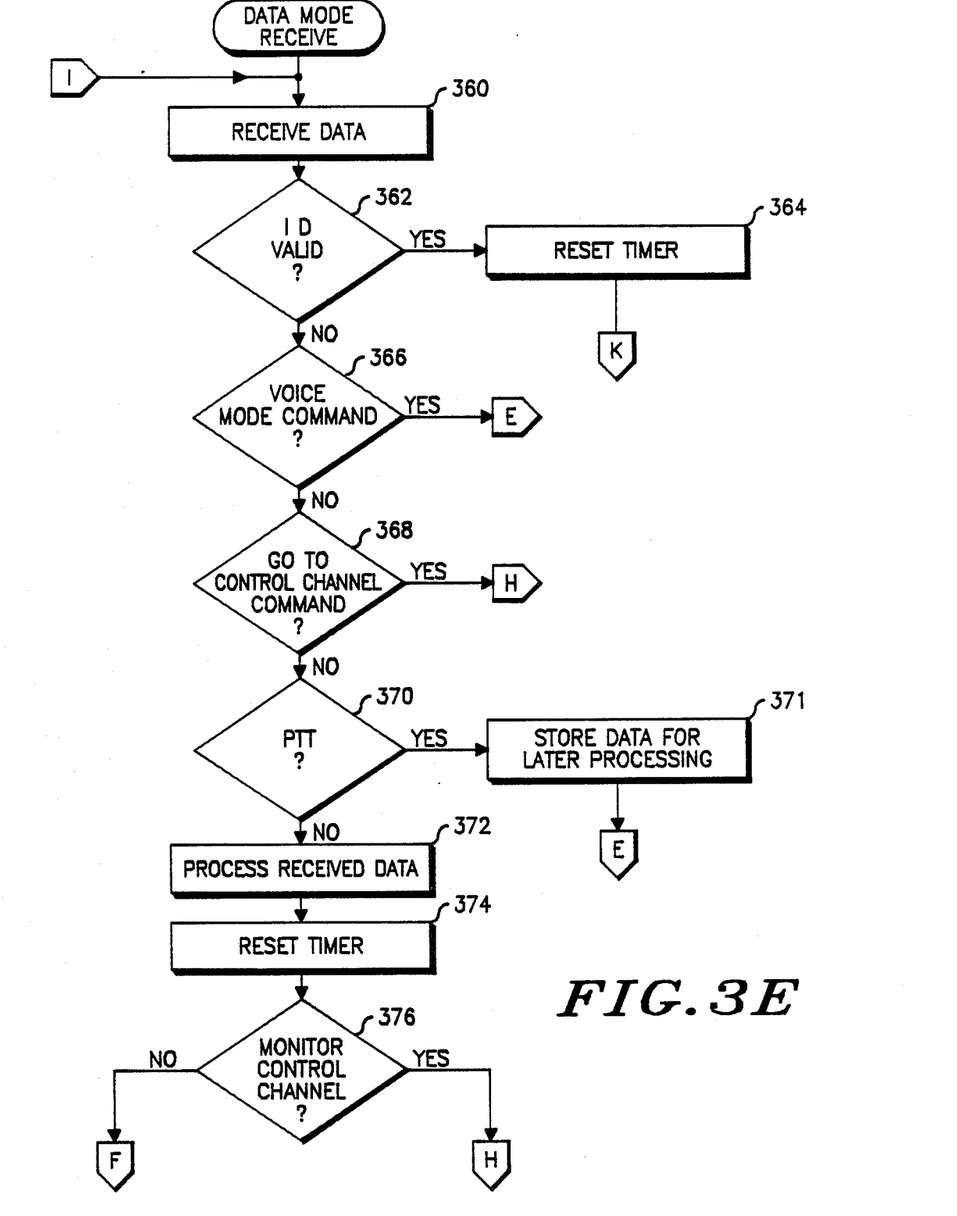

Referring now to FIG. 3e, the data mode receive sequence is illustrated. In step 360, the data is extracted from the data channel and received by the subscriber unit. Decision 362 determines whether the received data has an ID portion corresponding to the subscriber's ID. If not, either the data has been received in error or the data was not addressed to this subscriber unit. Accordingly, step 364 resets the activity timer and control is returned to reference letter K of FIG. 3d to again monitor activity on the data channel.

If the determination of decision 362 is that the ID is valid, the subscriber unit processes the information to receive the data and/or commands from the host computer 106. Decision 366 determines whether a voice mode command has been received. If so, the routine proceeds to reference letter E of FIG. 3b, where the subscriber unit switches to operate in the voice mode. If the determination of decision 366 is that a voice mode command was not received, decision 368 determines whether a "go-to control channel" command was received. If so, subscriber unit remains in the data mode, but adapts to monitor the control channel. Accordingly, program control is routed to reference letter H of FIG. 3c.

If the received data did not contain a voice mode or go-to control channel command, the routine proceeds to decision 370, which determines if the subscriber operator has pressed the push-to-talk switch to initiate a voice call. If the subscriber has initiated a voice call, the routine proceeds to step 371, which stores any received data for later processing, and returns control to reference letter E of FIG. 3b to process the voice call.

If the operator has not initiated a voice call, step 372 processes the received data in accordance with any instructions previously received or contained in the received data. Step 374 resets the data activity timer since data activity was recently received Decision 376 determines whether the subscriber unit operates in the voice monitor mode. If so, the routine proceeds to reference letter H of FIG. 3c to monitor the control channel. However, if the subscriber is a data monitor subscriber or a last mode subscriber, decision 376 returns control to reference letter F of FIG. 3d, and the data channel is monitored (step 350).

Figure 3F:
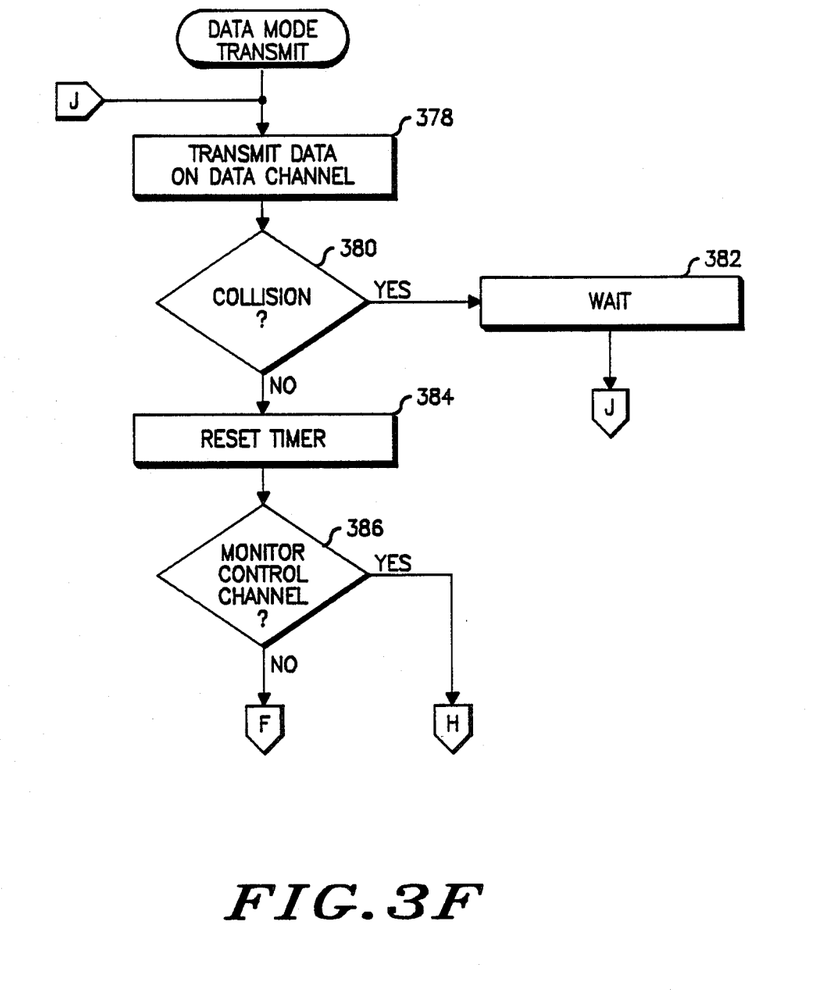

Referring now to FIG. 3f, the data transmit sequence of the data mode is illustrated. In step 378, the subscriber unit transmits the data onto the data channel using any suitable form of data modulation. Decision 380 determines whether the subscriber's transmission has collided with the transmission of another subscriber. Such collision detection schemes are well known in the art and the selection of any particular one scheme is not essential to the understanding of the invention. Assuming the determination of decision 380 was that a collision had occurred, the routine proceeds to step 382, which waits an arbitrary interval before returning control to reference letter J of FIG. 3f to transmit the data. If, however, no collision was detected, the routine proceeds to step 384, which resets the activity timer since the subscriber has just transmitted on the data channel. In step 386, the subscriber determines whether it operates in the voice monitor mode or whether it should continue to monitor the data channel (i.e., either last used mode or the data monitor mode). If the determination of decision 386 is that the subscriber should monitor the control channel, the routine proceeds to reference letter H of FIG. 3c. Otherwise, the routine proceeds to reference letter F of FIG. 3d to monitor the data channel.

Figure 4:
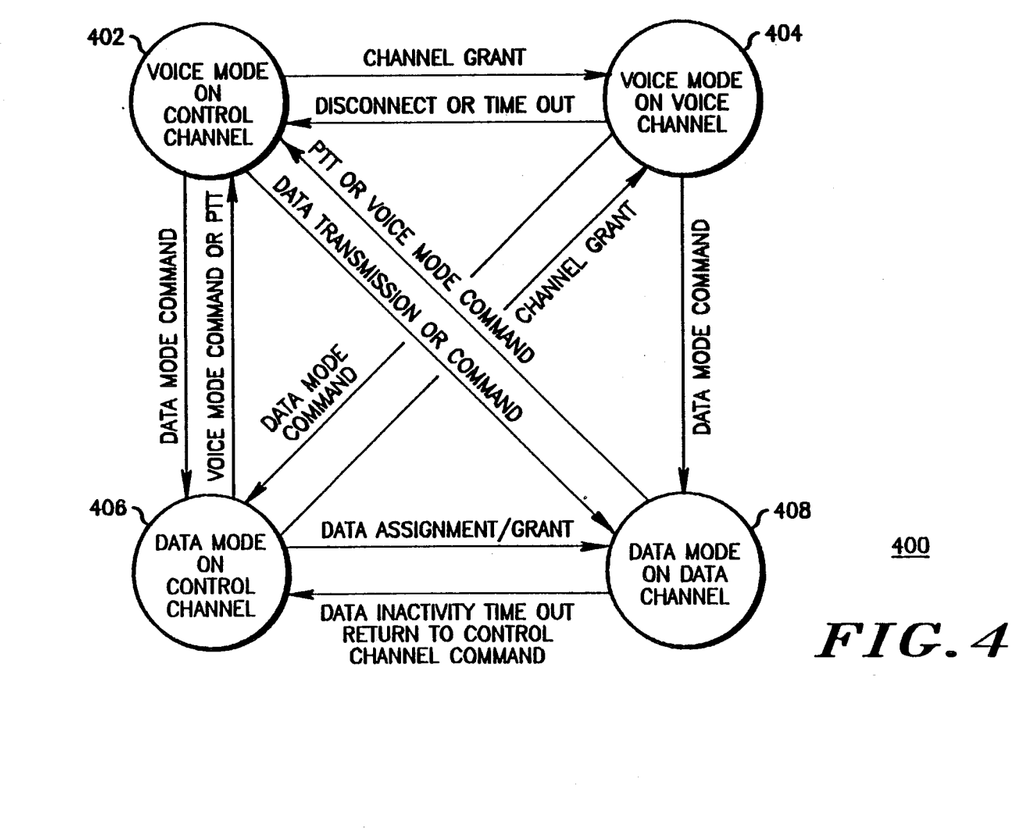
FIG. 4 is a state diagram illustrating the operation of the voice/data subscribers of FIG. 1.

Referring now to FIG. 4, a state diagram 400 illustrating the operation of the subscriber unit is shown. According to the present invention, the subscriber unit must always be on either the control channel, an assigned voice channel or an assigned data channel.

In state 402, the subscriber is operating in the voice mode on the control channel. The subscriber unit may participate in the voice call in state 404 by receiving a channel grant, and returns to the control channel state 402 by receiving a disconnect or timing out at the end of the call. Additionally, the subscriber may receive priority messages while participating in a voice call. Accordingly, if the subscriber receives a priority data mode command, the subscriber may abandon the voice call and either enter state 406, or go directly to state 408.

In state 406, the subscriber operates in the data mode, while monitoring the control channel. The subscriber may enter and leave this state via command of the host computer via the network controller and central controller. The commands can either return the subscriber to the voice mode in state 402 or remain in the data mode monitoring the data channel in state 408. In either of the data mode states (406 or 408) a push-to-talk command returns the subscriber to state 402. Additionally, receiving a channel grant rapidly moves the subscriber from state 406 directly to state 404 to participate in a voice call. Thus, the voice/data subscriber may move from one state to another state along any of the defined paths of the state diagram 400.

While a particular embodiment has been described and shown, it will be understood that the present invention is not limited thereto since many modifications can be made. It is therefore contemplated to cover by the present application any and all such modifications that fall within the true spirit and scope of the basic underlying principles disclosed and claimed herein.

What is claimed is:

1. In a trunked voice/data communication system having a plurality of voice/data subscriber units for communicating over a plurality of communication channels some of which may be allocated for data traffic, and a particular one of which is reserved as a control channel, a method for operating within said system comprising the steps of:

in at least one of said plurality of voice/data subscriber units;
   (a) determining whether at least one of the communication channels has been allocated for data traffic;
   (b) transmitting over the control channel, a data channel request if no data channels are currently allocated;
   (c) receiving over the control channel, a data channel grant which identifies a particular communication channel as a data channel;
   (d) operating, thereafter, on said data channel until receiving a command over said data channel to monitor said control channel.

2. In a trunked voice/data communication system having a plurality of voice/data subscriber units for communicating over a plurality of communication channels, some of which may be allocated for data traffic, and a particular one of which is reserved as a control channel, a method for operating within said system comprising the steps of:

in at least one of said plurality of voice/data subscriber units;
   (a) determining whether at least one of the communication channels has been allocated for data traffic;
   (b) transmitting over the control channel, a data channel request if not data channels are currently allocated;
   (c) receiving, over the control channel, a data channel grant, which identifies a particular communication channel as a data channel;
   (d) operating, thereafter, on said data channel until a predetermined event occurs;
said method further including the step of receiving, over said data channel, an information message identifying additional communication channels of said plurality of communication channels as data channels.

3. The method of claim 1, which includes the step of storing, in a storage means, the identity of each of said plurality of communication channels allocated as data channels.

4. In a trunked voice/data communication system having a plurality of voice/data subscriber units for communicating over a plurality of communication channels, some of which may be allocated for data traffic, and a particular one of which is reserved as a control channel, a method for operating within said system comprising the steps of:

in at least one of said plurality of voice/data subscriber units;
   (a) determining whether at least one of the communication channels has been allocated for data traffic;
   (b) transmitting, over the control channel, a data channel request if no data channels are currently allocated;
   (c) receiving, over the control channel, a data channel grant, which identifies a particular communication channel as a data channel;
   (d) operating, thereafter, on said data channel until the initiation of a voice channel request.

5. In a trunked voice/data communication system having a plurality of voice/data subscriber units for communicating over a plurality of communication channels, some of which may be allocated for data traffic, and a particular one of which is reserved as a control channel, a method for operating within said system comprising the steps of:

in at least one of said plurality of voice/data subscriber units;
   (a) determining whether at least one of the communication channels has been allocated for data traffic,
   (b) transmitting, over the control channel, a data channel request if no data channels are currently allocated;
   (c) receiving, over the control channel, a data channel grant, which identifies a particular communication channel as a data channel;
   (d) operating, thereafter, on said data channel until a predetermined event occurs;
said method further including the step of receiving, over said control channel, an information message identifying additional communication channels of said plurality of communication channels as data channels.

6. In a trunked voice/data communication system having a plurality of voice/data subscriber units for communicating over a plurality of communication channels some of which may be allocated for data traffic, and a particular one of which is reserved as a control channel, a method for operating in a data mode within said system comprising the steps of:

in at least one of said plurality of voice/data subscriber units;
   (a) determining whether at least one of the communication channels has been allocated for data traffic;
   (b) transmitting, over the control channel, a data channel request if no data channels are currently allocated;

(c) receiving, over the control channel, a data channel grant, which identifies a particular communication channel as a data channel;
(d) operating on said data channel until the expiration of a predetermined time interval during which there was no data activity, and, thereafter, monitoring said control channel;
said method further including the step of receiving, over said data channel an information message identifying additional communication channels of said plurality of communication channels as data channels.

7. The method of claim 6, which includes the step of storing, in a storage means, the identity of each of said plurality of communication channels allocated as data channels.

8. In a trunked voice/data communication system having a plurality of voice/data subscriber units for communicating over a plurality of communicating channels, some of which may be allocated for data traffic, and a particular one of which is reserved as a control channel, a method for operating in a data mode within said system comprising the steps of:
in at least one of said plurality of voice/data subscriber units;
  (a) determining whether at least one of the communication channels has been allocated for data traffic;
  (b) transmitting, over the control channel, a data channel request if no data channels are currently allocated;
  (c) receiving, over the control channel, a data channel grant, which identifies a particular communication channel as a data channel;
  (d) operating on said data channel until the expiration of a predetermined time interval during which there was no data activity, and, thereafter, monitoring said control channel;
said method further including the step of receiving, over said control channel, an information message identifying additional communication channels of said plurality of communication channels as data channels.

9. In a trunked voice/data communication system having a plurality of voice/data subscriber units for communicating over a plurality of communication channels, some of which may be allocated for data traffic, and a particular one of which is reserved as a control channel, a method for operating within said system comprising the steps of:
in at least one of said plurality of voice/data subscriber units:
  (a) determining whether at least one of the communication channels has been allocated for data traffic;
  (b) transmitting, over the control channel, a data channel request if no data channels are currently allocated;
  (c) receiving, over the control channel, a data channel grant, which identifies at least one communication channel as a data channel, and further identifies a particular one of said at least one identified communication channels as a first allocated data channel;
  (d) selecting one of said data channels from said at least one identified communication channels;
  (e) operating, thereafter, on said selected data channel until a predetermined event occurs.

10. The method of claim 9, wherein said predetermined event comprises receiving a command over said selected data channel to monitor said control channel.

11. The method of claim 9, which includes the step of receiving, over said data channel, an information message identifying additional communication channels of said plurality of communication channels as data channels 12. The method of claim 11, which includes the step of storing, in a storage means, the identity of each of said plurality of communication channels allocated as data channels.

13. The method of claim 9, wherein said predetermined event comprises receiving a command over said selected data channel to monitor said first allocated data channel.

14. The method of claim 9, wherein said predetermined event comprises the absence of data activity over a predetermined time interval 15. The method of claim 9, wherein said predetermined event comprises the initiation of a voice channel request.

16. In a trunked voice/data communication system having a plurality of voice/data subscriber units for communicating over a plurality of communication channels, some of which may be allocated for data traffic, and a particular one of which is reserved as a control channel, a method for operating within said system comprising the steps of:
in at least one of said plurality of voice/data subscriber units:
  (a) determining whether at least one of the communication channels has been allocated for data traffic;
  (b) transmitting, over the control channel, a data channel request if no data channels are currently allocated;
  (c) receiving, over the control channel, a data channel grant, which identifies at least one of said plurality of communication channels as data channels, and further identifies a particular one of said at least one of said plurality of communication channels as a first allocated data channel;
  (d) operating on a data channel selected from said at least one of said plurality of communication channels until commanded to otherwise operate according to one of the group of commands:
    (i) monitor said control channel;
    (ii) monitor said first allocated data channel;
    (iii) generate a voice call request;
    and, thereafter, operating in accordance with said command.

17. In a trunked voice/data communication system having a plurality of voice/data subscriber units for communicating over a plurality of communication channels, some of which may be allocated for data traffic, and a particular one of which is reserved as a control channel, a voice/data subscriber unit comprising:
  means for determining whether at least one of the communication channels has been allocated for data traffic;
  means for transmitting, over the control channel, a data channel request if no data channels are currently allocated;
  means for receiving, over the control channel, a data channel grant, which identifies at least one communication channel as a data channel, and further identifies a particular one of said at least one identified communication channels as a first allocated data channel;
  means for selecting one of said data channels from said at least one identified communication channels;
  means for operating, thereafter, on said selected data channel until a predetermined event occurs.

* * * * *